United States Patent [19]
Barnett

[11] Patent Number: 5,271,354
[45] Date of Patent: Dec. 21, 1993

[54] INSECT CONTROL COLLAR FOR A PET

[76] Inventor: Ralph R. Barnett, 184 A.R. Park St., Greer, S.C. 29651

[21] Appl. No.: 64,893

[22] Filed: May 24, 1993

[51] Int. Cl.⁵ .............................................. A01K 27/00
[52] U.S. Cl. .............................................. 119/861
[58] Field of Search .................. 119/96, 106, 109, 156

[56] References Cited
U.S. PATENT DOCUMENTS

| | | | |
|---|---|---|---|
| 1,127,249 | 2/1915 | Hughes | 119/106 |
| 2,205,711 | 6/1940 | Banks | 119/106 |
| 2,401,253 | 5/1946 | Lamb, Jr. | 119/106 |
| 3,304,646 | 2/1967 | Staley | 43/131 |
| 4,068,624 | 1/1978 | Ramney | 119/106 |
| 4,224,901 | 9/1980 | Carey, Jr. | 119/106 |
| 4,800,671 | 1/1989 | Olson | 43/108 |

Primary Examiner—Gene Mancene
Assistant Examiner—Thomas Price
Attorney, Agent, or Firm—Gerald R. Boss; Cort Flint

[57] ABSTRACT

An annular collar 10 for animals is comprised of an elongated band having a top member 12 and a bottom member 14. Support structure 16 is carried between top member 12 and bottom member 14 and space top member 12 and bottom member 14 apart defining first edge 17a and second edge 17b. Support structure 16 defines side passages 22 having side openings in communication with first edge 17a and second edge 17b. Side passages 22 communicating with insect controlling chemical 20 which is disposed within collar 10.

20 Claims, 2 Drawing Sheets

INSECT CONTROL COLLAR FOR A PET

BACKGROUND OF THE INVENTION

This invention relates to a collar for the control of insects and the like for use with animals having an insect controlling substance disposed within the collar. Many types of insect control for domestic animals have been developed. Collars placed around the neck of domestic animals have been used. As evidenced by U.S. Pat. Nos. 2,205,711 and 4,068,624 the most widely used type of insect control involves the use of a chemical insecticide embedded or implanted within the collar. These insecticides through emission come in contact with the animal. While these insecticides may be safe to use, a health risk to the animals may still exist and non-exposure to the animal of such insecticides may prove healthier. Furthermore, the use of emissions rather than direct contact is often less effective in controlling insects.

The use of adhesives and other capturing schemes have been utilized in the control of insects in situations not involving animals. U.S. Pat. No. 3,304,646 discloses the use of a covered trap housing an insect-adhering adhesive to be used for household applications. U.S. Pat. No. 4,800,671 discloses the use of an insect trapping band to be used on a tree.

While the concept of using adhesives for the capturing of insects is known, the application of such a concept to the control of insects with respect to animals has not heretofore been developed. By utilizing an adhesive for the capturing of insects, the animal is not exposed to potentially toxic chemicals or harmful insecticides.

Accordingly, an object of the present invention is to provide an insect control for animals which may utilize an insecticide, but which reduces exposure of the insecticide to the animal.

Accordingly, an object of the present invention is to provide an insect control for animals which may utilize an insect-adhering system.

A further object of the present invention is to provide an insect control for animals which may utilize an insect-adhering system which does not expose the animal to any chemicals.

A further object of the present invention is to provide a highly effective method for controlling insects on animals.

SUMMARY OF THE INVENTION

The above objectives are accomplished according to the invention by providing an elongated band for encircling annularly around the animal in the form of a collar having passages which are in communication with an insect controlling substance disposed within the band. The band has a top and bottom surface which are joined together by structural supports. The structural supports elevate the top surface above and parallel to the bottom surface thereby spacing said top and bottom surfaces apart. The structural supports create or contain passages having openings on the outer periphery of the band allowing the insects to enter into the band.

Within the band an insect controlling chemical is disposed. The insect controlling chemical may be an adhesive or an insecticide whereby the insect is either captured or poisoned upon contact with the controlling substance. The advantageous result is that the insect will be destroyed and not merely warded off of the animal into the domestic surroundings. The insect controlling chemical may be embedded on both the top member and the bottom member providing complete insect control when the band is encircled around the animal.

The structural supports are multi-functional. The supports consist of a structure which allows for passage of the insects into the band, provide support to the top surface of the band thereby spacing the top surface from the bottom surface, and also prevent any animal hair from coming in contact with the insect controlling chemical disposed within the band. By restricting the path that an insect must travel from one part of the animal's body to another, in order to traverse the animal, the insect is required to proceed though the passage and consequently forced to come in contact with the insect controlling chemical.

Thus it can be seen that a more advantageous method for controlling insects on a pet can be had according to the present invention. The structure of the present invention is designed to entrap insects as they exhibit their natural tendency of traversing the animal from the animal's body to the animal's head. By directing the insect through a restricted route, the insect is required to engage the insect control chemical. If the insect control chemical is an adhesive, the insect is trapped in the band. If the insect control substance is an insecticide, the insect will become contaminated upon contact with the chemical. This method is highly effective because the insect is directly controlled instead of merely being warded away from the animal.

Furthermore, if the insect control substance used is an adhesive, the animal owner through inspection of the collar, may detect the effectiveness of the insect control device and ascertain if the animal is flea-free.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
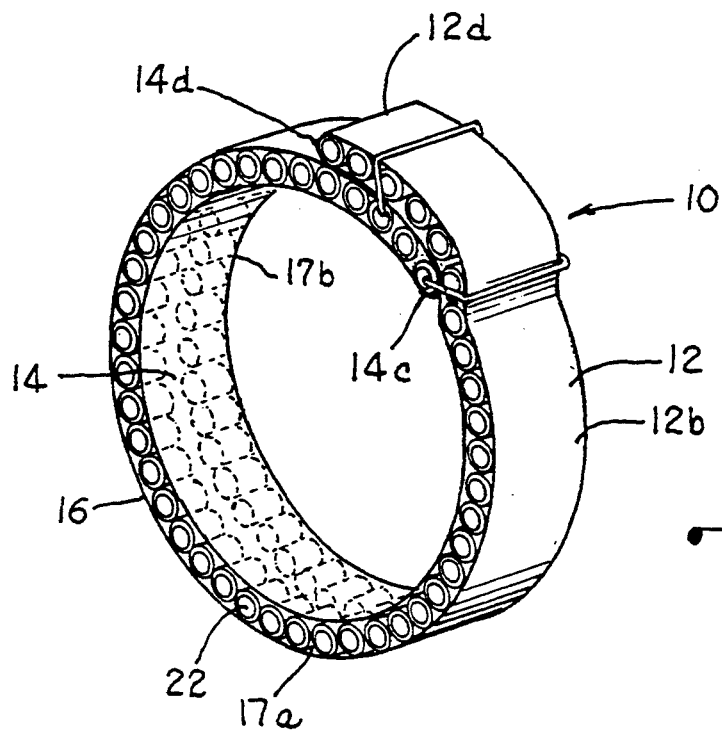
FIG. 1 is a perspective view of an insect control collar according to the invention.
Figure 3:
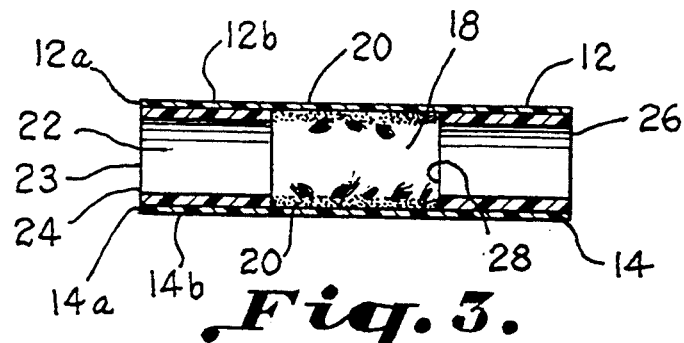
FIG. 3 is a sectional side view of the insect control collar according to the invention of FIG. 2 taken along line 3—3 illustrating the ensnaring of fleas.
Figure 2:
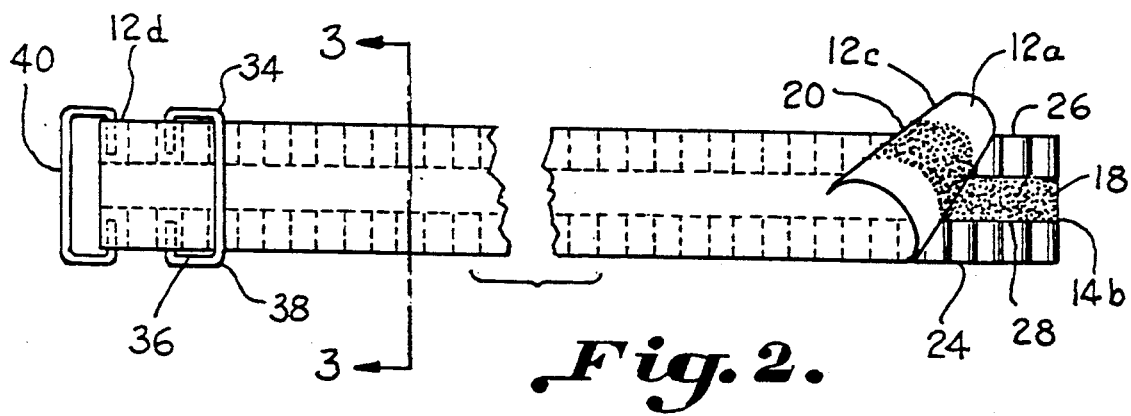
FIG. 2 is a top view of the insect control collar with the top member peeled back revealing the interior of the collar.

An annular collar 10 for animals is comprised of an elongated band having a top member 12 and bottom member 14. Both top member 12 and bottom member 14 are preferably straps. Top member 12 has an interior 12a, an exterior 12b and opposite ends 12c and 12d. Bottom member 14 is generally opposed from top member 12 and has an interior 14a, an exterior 14b and opposite ends 14c and 14d. Both top member 12 and bottom member 14 are made from all-weather material which is flexible for allowing the collar to be encircled around the animal forming an annular collar 10. A suitable material is polyurethane.

Support means 16 are carried between top member 12 and bottom member 14, and space top member 12 and bottom member 14 apart defining first edge 17a and second edge 17b. Support means 16 in conjunction with top member 12 and bottom member 14 define a chamber 18. An insect control chemical 20 is disposed within chamber 18 preferably embedded on interior 12a of top member 12 and interior 14a of bottom member 14. Insect controlling chemical 20 may be an adhesive or an insecticide embedded in the chamber providing complete insect control when collar 10 is encircled around the animal.

Support means 16 defines side passages 22 having side openings 23 in communication with first edge 17a and second edge 17b. As shown in FIG. 1, support means 16 preferably consists of a first plurality of structural supports 24 and a second plurality of structural supports 26 opposite from first plurality of structural supports 24. This configuration provides for insect control from two directions. First plurality of support structures 24 and second plurality of support structures 26 extend laterally inward toward the center of top member 12 and bottom member 14 thereby allowing side passages 22 to communicate with chamber 18. The optimal extension will provide maximum support of top member 12 and bottom member 14 such that neither top member 12 nor bottom member 14 may be depressed thereby quashing chamber 18 while providing for a desirable chamber area for the disposition of insect control chemical 20.

As shown in FIG. 1, support means 16 preferably are tubular defining side passages 22 with side openings 23 defined in edges 17a and 17b. Side passages 22 consist of exits 28 in communication with chamber 18.

Figure 4:
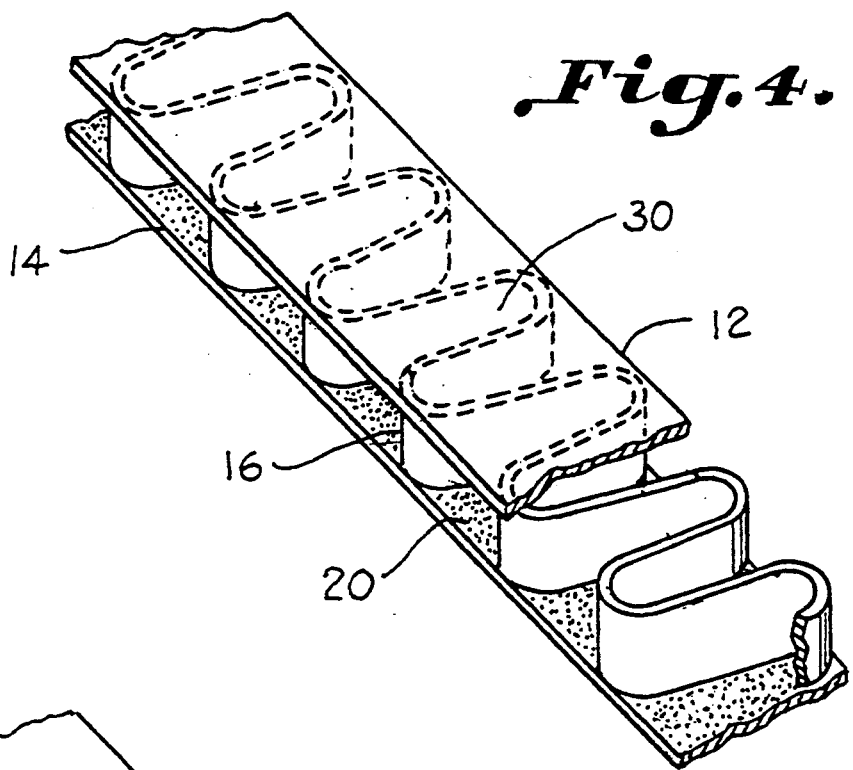
FIG. 4 is a perspective view of an insect control collar with a corrugated structure for creating passages leading into the chamber according to the invention.

Another configuration of the invention is shown in FIG. 4. Support means 16 are comprised of a horizontally corrugated structure having longitudinal passages 30 formed from the repetitious arcing of the corrugated structure. Passages 30 extend from the outer periphery of collar 10 towards the opposite periphery. Insect control substance 20 is deposited within passages 30.

Figure 5:
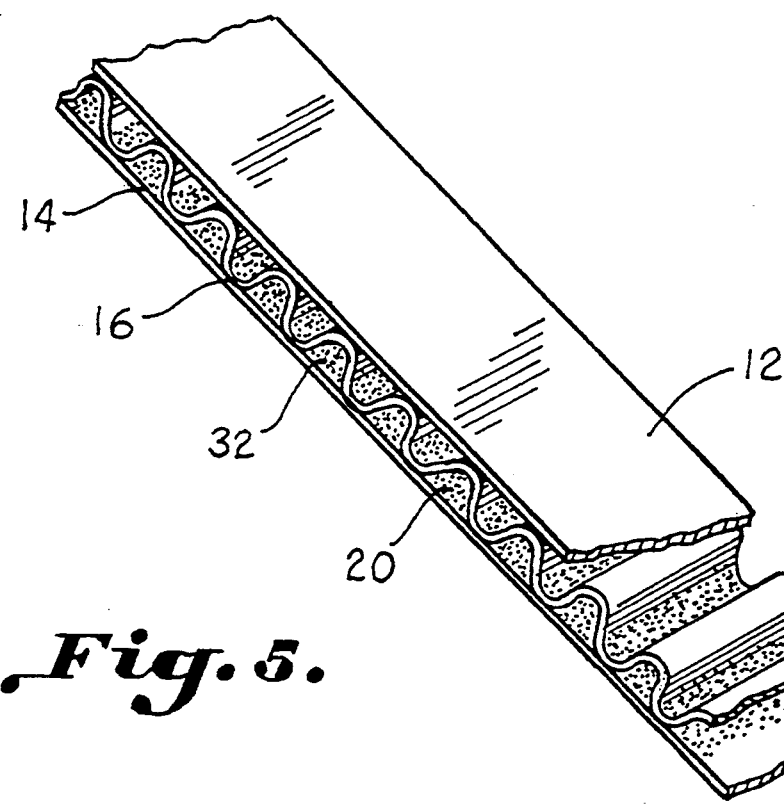
FIG. 5 is a perspective view of an insect control collar with a corrugated structure for creating passages leading into the chamber according to the invention.

Another configuration of the invention is shown in FIG. 5. Support means 16 are comprised of a vertically corrugated structure having partially enclosed longitudinal passages 32 formed from the repetitious arcing of the corrugated structure. Passages 32 extend from the outer periphery of collar 10 towards the opposite periphery. Passages 32 are enclosed by the respective arc of the corrugated structure. Insect control substance 20 is deposited within passages 32.

A securing means 34 secures the opposite ends of the collar. Securing means 34 consists of a securing clasp 36 and a retention clasp 40 which retains the excess collar.

Each of these configurations effectively control insects by utilizing passages to direct the travel of an insect such that the insect comes in contact with an insect control chemical whereby the insect is destroyed. These are just some possible configurations according to the invention.

In the preferred configuration top member 12 is slightly longer than bottom member 14 preventing any gaps developing between support means 16 when collar 10 encircles the animal due to the circumferential difference between top member 12 and bottom member 14.

While a preferred embodiment of the invention has been described using specific terms, such description is for illustrative purposes only, and it is to be understood that changes and variations may be made without departing from the spirit or scope of the following claims.

What is claimed is:

1. A collar for the control of insects and the like for use with animals comprising:
   an elongated band including a top member;
   said elongated band including a bottom member, said bottom member being generally opposed to said top member;
   a support means carried between said top and bottom members for spacing said top and bottom members apart;
   an insect control chemical carried within said band between said bottom and top members;
   side passages extending laterally inward into said band communicating with said insect control chemical, said side passages including hollow portions extending at least partially across a width of said band for entry by said insect in contact with said control chemical;
   said insect control chemical being disposed within said band so that said insects enter said passage and are directed to and come into contact with said insect control chemical.

2. The collar of claim 1 wherein said support means defines said side passages.

3. The collar of claim 1 wherein said support means is comprised of a first plurality of structural supports and a second plurality of structural supports, said first and said second plurality of structural supports defining said side passages.

4. The collar of claim 3 wherein said first and second plurality of structural supports are tubes.

5. The collar of claim 4 wherein a chamber is defined between said bottom and top members in conjunction with said first and second plurality of structural supports, said chamber in open communication with said side passages, said insect control chemical being disposed within said chamber.

6. The collar of claim 1 wherein said support means are tubes.

7. The collar of claim 1 wherein said support means are corrugated.

8. The collar of claim 1 wherein said insect control chemical is an insecticide.

9. The collar of claim 1 wherein said insect control chemical is an adhesive.

10. A collar for the control of insects and the like for use with animals comprising:
    an elongated top member having a certain width and opposite ends, said top member having an interior and an exterior surface;
    an elongated bottom member having a certain width and opposite ends, said bottom member having an interior and an exterior surface, said bottom member being generally opposed to said top member;
    a plurality of structural supports carried between said interior surfaces of said top and bottom members;
    a plurality of side openings defined between said top and bottom members in conjunction with said structural supports;
    a plurality of laterally extending passages defined by said structural supports which communicate with said side openings;

an insect control chemical disposed between said top and bottom members so that said insects enter said side openings and are directed through said passages into contact with said insect control chemical.

11. The collar of claim 10 wherein said plurality of structural supports extend laterally across said top and bottom members and have a length generally equal to or less than said width of said top and bottom members.

12. The collar of claim 11 wherein said plurality of structural supports having a first plurality and a second plurality of structural supports, said second plurality of structural supports being opposite from said first plurality of structural supports.

13. The collar of claim 12 wherein said first and second plurality of structural supports have a combined length less than said width of said top and bottom members thereby defining a chamber.

14. The collar of claim 10 wherein said plurality of structural supports are tubes.

15. The collar of claim 10 wherein said plurality of structural supports are corrugated.

16. The collar of claim 10 wherein said insect control chemical is an insecticide.

17. The collar of claim 10 wherein said insect control chemical is an adhesive.

18. A collar for the control of insects and the like for use with animals comprising:
- a flexible band for encircling a body portion of said animal;
- said band including a first and second side edges defining an annular periphery when encircling said body portion of said animal;
- a plurality of side openings formed in said first and second side edges, said side openings opening into transverse hollow passages; and
- an insect control chemical disposed within said band and positioned to provide an insect tranversing path at least partially across said hollow passages, wherein said insects can enter said side openings and come into contact with said insect control chemical.

19. The collar of claim 18 wherein said insect control chemical is an insecticide.

20. The collar of claim 18 wherein said insect control chemical is an adhesive.

* * * * *

UNITED STATES PATENT AND TRADEMARK OFFICE
CERTIFICATE OF CORRECTION

PATENT NO. : 5,271,354
DATED : 12/21/93
INVENTOR(S) : Ralph R. Barnett

It is certified that error appears in the above-indentified patent and that said Letters Patent is hereby corrected as shown below:

Column 4, Claim 1, line 21, is "hollow potions" should be --hollow portions--;

Signed and Sealed this

Twenty-fourth Day of May, 1994

Attest:

BRUCE LEHMAN

Attesting Officer    Commissioner of Patents and Trademarks